United States Patent [19]
Das et al.

[11] Patent Number: 5,703,708
[45] Date of Patent: Dec. 30, 1997

[54] ADJUSTABLE OPTICAL DELAY LINE

[75] Inventors: Chandan Das, Gauting; Ulrich Gaubatz, Munich; Erich Gottwald, Holzkirchen, all of Germany

[73] Assignee: Siemens Aktiengesellschaft, Munich, Germany

[21] Appl. No.: 583,656

[22] Filed: Jan. 5, 1996

[30]     Foreign Application Priority Data

Jan. 23, 1995 [DE] Germany .................. 195 01 919.9

[51] Int. Cl.$^6$ ................................... H04J 14/08
[52] U.S. Cl. .................. 359/140; 250/227.12; 385/1
[58] Field of Search .................. 359/140, 135, 359/110; 250/227.12; 385/1–3, 12, 35

[56]           References Cited

U.S. PATENT DOCUMENTS

| | | | |
|---|---|---|---|
| 5,111,322 | 5/1992 | Bergano et al. | 359/140 |
| 5,131,062 | 7/1992 | Eide et al. | 385/12 |
| 5,355,423 | 10/1994 | Phillips | 385/12 |

FOREIGN PATENT DOCUMENTS

| | | | |
|---|---|---|---|
| 8605343 | 9/1986 | WIPO | 359/140 |
| 8800415 | 1/1988 | WIPO | 359/140 |

*Primary Examiner*—Kinfe-Michael Negash
*Attorney, Agent, or Firm*—Hill, Steadman & Simpson

[57]              ABSTRACT

When merging optical pulse streams having a high bit rate, there is the problem that, for example given a bit rate of 40 Gbit/s, the pulses at the multiplexer output have 25 pulses temporal spacing and approximately 5 mm spatial spacing. Given a precision of 10% of the bit rate, the light waveguides must be matched with a precision of 0.5 mm, which previously required mechanical or inserted length-adjustable open beam optics and which leads to high outlay. In the optical delay line, by contrast, the temperature of a light waveguide is varied such that the desired optical length is set via the change in the refractive index of the optical fibers. The optical fibers are wound on coil bodies that have a through bore containing a heating element connected to a temperature control.

19 Claims, 1 Drawing Sheet

ADJUSTABLE OPTICAL DELAY LINE

BACKGROUND OF THE INVENTION

The present invention is directed to an adjustable optical delay line.

In optical time-division multiplex systems, it is often necessary to combine two or more data-modulated pulse trains that arrive on different light waveguides on a single light waveguide. It is thereby a prerequisite that the pulses are comparatively short as compared to the bit duration. Expressed more precisely, the pulse duration given n pulse trains to be merged is less than 1/n of the bit duration of the respective pulse train. In order for the pulses of the individual pulse trains to proceed in cyclical succession into the light waveguide provided for the transmission, a corresponding phase relation of the individual pulses relative to one another is a pre-condition that can be achieved by adjustable delay lines. When multiplexing, for example, four optical signal streams with the respective bit rates of 10 Gbit/s to form a data stream with an aggregate rate of 40 Gbit/s, the pulses at the multiplex output must occur at a spacing distance of 25 ps from one another in the ideal case. This, however, corresponds to an optical path of about 5 mm in the optical fiber. When the spacing of the pulses are to have a precision of 10% of the bit rate, the lengths of the light waveguides before the 4:1 coupler, serving as a multiplexer, must then be matched with a precision of 0.5 mm. Such precision is extremely difficult to achieve in practice.

Given low bit rates, it is possible and obvious for length matching of the light waveguides to splice the light waveguides together with optimum precision with reference to the correct length differences. This, however, is extremely difficult and also extremely involved in practice given high data rates and given a large number of light waveguides. One solution is that the length differences are realized by inserting open beam optics that can be mechanically adjusted in length. To this end, the optical input signals are coupled out of the light waveguides and are brought together again in light waveguides after an adjustable open-beam transmission path. In this case, high mechanical stability and precision of the arrangement are required in order to minimize insertion attenuations that occur due to misadjustments in the infeed into the comparatively thin light waveguides. Given employment of integrated light waveguide structures wherein the differences in running time are produced by paths of different lengths in the integrated light waveguide, high insertion attenuations result at the two transition points from and to the integrated light waveguide. In addition such a waveguide is not adjustable to different data rates.

SUMMARY OF THE INVENTION

It is an object of the present invention to provide an optical delay line having, given comparatively little outlay, a delay that is controllable and adjustable for different data rates given optimally low attenuation.

The particular advantage of the inventive solution is in its employability even at the highest bit rates of, for example, 160 Gbit/s.

In general terms the present invention is an optical delay line having a light waveguide connected between input and output and having a variable delay. The temperatures of the light waveguide is adjustable and controllable.

Advantageous developments for the present invention are as follows.

The light waveguide is wound on a coil body that can be arranged in a heatable liquid. The coil body is composed of a material with good thermal conductivity, particularly of metal.

The coil body has a central bore in which a heating element connected to a means for temperature control is secured in highly thermally conductive fashion.

The optical delay line is used in a multiplexer for optical digital signals. A first modulator is directly connected to a source of optical pulses that are comparatively short compared to their repetition rate. At least one series circuit of an optical delay line and a further modulator is also connected to the source. The delay of the first optical delay line corresponds to a bit period of the optical digital signals and that of the further optical delay lines respectively corresponds to a bit period longer than that of the preceding optical delay lines. The outputs of the modulators are connected to a common light waveguide that is connected to the optical output. The sequence of optical delay line and modulator is interchangeable in the respective light path.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
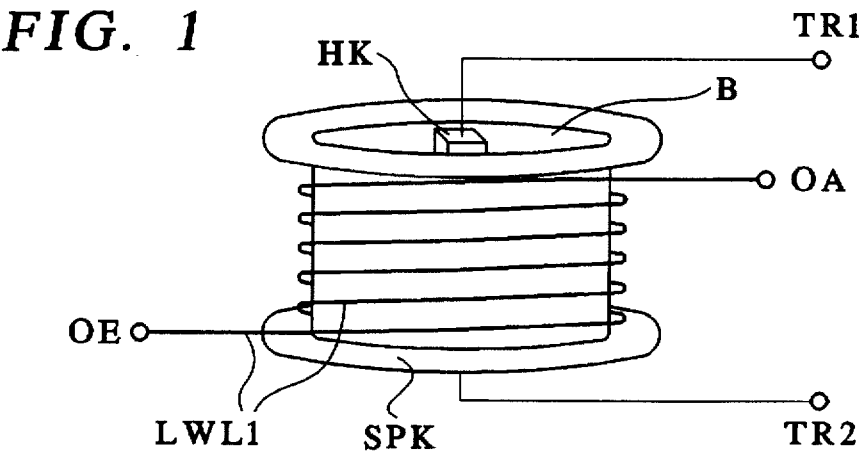
FIG. 1 depicts an optical delay line according to the present invention.

In FIG. 1, a first light waveguide LWL1 having a length of a few hundred meters is wound on a coil member SPK. The two terminals of the first light waveguide LWL1 represent the optical input OE and the optical output OA of the delay line. The coil member SPK has a central bore B in which a heating element HK is secured. The heating element is connected via first and second terminals TR1,TR2 to a means for temperature control (not shown). The heating element HK is supplied with a corresponding heating current by this means. For good heat conduction the heating element is secured in the metallic coil member SPK with a thermally conductive paste. In order to protect the winding formed of the first light waveguide LWL1 from thermal disturbances, a thermal insulation is also applied onto the winding. It is also possible, moreover, to arrange the light waveguide by itself or with a coil member in a heatable liquid.

The function of the optical delay line is based on the temperature-dependency of the refractive index of the glass used for the light waveguide, the optical length of the light waveguide thereby changing with variation of the temperature. The effective optical length of the delay line is adjustable and can also be easily regulated by the temperature control with pre-adjustment. Since the variation of the optical length, in addition to being dependent on the variation of refractive index, is also dependent on the absolute length of the light waveguide, the desired degree of the change in running time of the optical pulses can be selected on the basis of the of a corresponding length selection.

Figure 2:
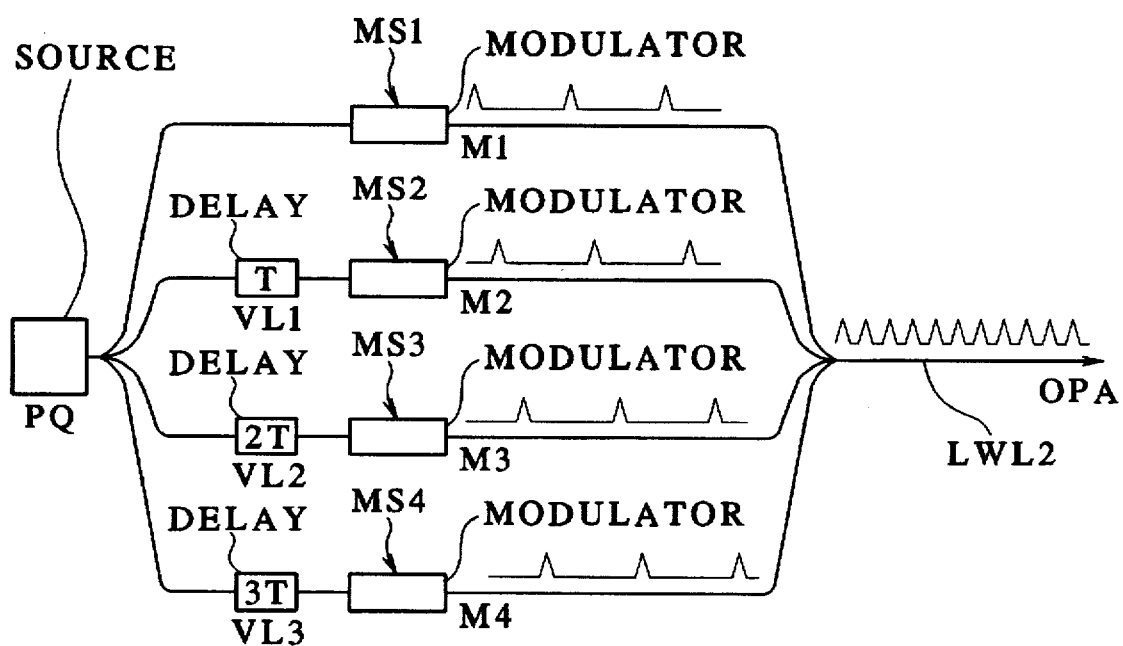
FIG. 2 shows an inventive application of the optical delay line of FIG. 1 in an optical multiplexer.

FIG. 2 shows an optical multiplexer for four digital optical signals having a bit rate of about 10 Gbit/s using three of the optical delay lines shown in FIG. 1 and further component parts. The inventive multiplexer receives pulses with a repetition rate of 10 GHz from a pulse source PQ. These pulses are directly supplied to the optical input of a first modulator M1 and are respectively supplied to the optical inputs of a second, third and fourth modulator M2,M3,M4 via first, second or third optical delay lines, respectively. A first modulation signal is supplied to the first modulator M1 via the modulation signal input MS1 thereof and the first modulator generates a correspondingly modulated optical signal that is output from the output of the first modulator M1 to a second light waveguide LWL2 that represents the connection to the optical output OP of the multiplexer. The second optical modulator M2 is preceded by a first optical delay line VL1 in the signal path that has a delay T corresponding to the bit period of the multiplex signal appearing in the second light waveguide LWL2, that is, to the bit period of a modulating signal supplied to the modulators M1 . . . M4 divided by the plurality n of signal paths (divided by 4 in the exemplary embodiment). What the first delay line VL1 thus assures is that the optical pulse modulated by the modulation signal adjacent at the modulation signal input MS2 of the second modulator M2 falls into the time slot that follows the pulse output by the first modulator M1. Correspondingly, the third modulator M3 is preceded by a second optical delay line VL2 in the light path between the pulse source PQ and the optical input of the third modulator M3, whereby the second optical delay line VL2 produces double the delay 2T as compared to the delay T of the first optical delay line VL1. The modulation signal adjacent at the modulation signal input MS3 of the third modulator M3 generates a modulated optical pulse that falls into a time slot that follows the pulse output by the second modulator M2. For the transmission of the modulation signal pending at the modulation signal input MS4 of the fourth modulator M4, the fourth modulator M4 receives an optical pulse generated by the pulse source PQ via a third optical delay line VL3, this optical pulse being shifted in time by triple the delay time 3T as compared to the optical pulse of the first delay line VL1.

The transmission of the second output pulse of the first modulator M1 follows the transmission of the optical output signal of the fourth modulator M4, so that the merging of the output pulses of the individual modulators cyclically repeats. A precondition for the temporal merging of the output signals of the modulators is that these output signals and, thus, the output signals of the pulse source PQ as well have a duration that is less than 1/n of the bit duration of the pulse trains to be merged, where n corresponds to the plurality of modulators and, thus, pulse trains to be merged.

The sequence of optical delay line and modulator can be interchanged in the respective light path. In view of the different polarization states given employment of ordinary single-mode fibers as light waveguides, the employment of polarization-preserving optical fibers in the connections in the multiplexer or the insertion of polarization regulators or polarization setters is meaningful. These measures are especially necessary when the optical pulses must have a predetermined polarization state. This is required, for example, in the transmission of signals in polarization multiplex, given the polarization-dependency of the receive-side demultiplex arrangement, given polarization sensitivities of further parts of the transmission path or given the transmission of only two output signals deriving from optical multiplexers in polarization multiplex on a single light waveguide.

In view of the selection of the absolute length of the light waveguides used for the optical delay line, the case can arise that optical light pulses, output successively by the pulse source PQ, no longer immediately follow one another in the multiplex signal, but that a successor pulse appears one or more multiplex cycles later. This does not deteriorate the transmission of the individual modulation signals insofar as these are not correlated with one another. In the latter instance, however, the adjustability of the inventive optical delay lines makes it possible to assure the correct sequence of the individual, modulated optical pulses.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An optical delay line having a line input and a line output and having a variable delay, comprising:

a light waveguide connected between the line input and the line output, the light waveguide being wound on a coil body; and a device for adjusting and controlling the temperature of the light waveguide;

the coil body having a central bore in which a heating element, connected to a temperature control, is secured in highly thermally conductive fashion.

2. The optical delay line according to claim 1, wherein the coil body is composed of a material with good thermal conductivity.

3. The optical delay line according to claim 1, wherein the coil body is composed of a metal.

4. The optical delay line according to claim 1, wherein the optical delay line is employed in a multiplexer for optical digital signals, whereby a first modulator is directly connected to a source of optical pulses that are comparatively short compared to a repetition rate of the optical pulse; wherein at least one series circuit of a first optical delay line and second modulator is also connected to said source; and wherein a delay of the first optical delay line corresponds to a bit period of the optical digital signals and a delay of a further optical delay line, respectively corresponds to a bit period longer than that of a preceding optical delay line; wherein outputs of the modulators are connected to a common light waveguide connected to an optical output of the multiplexer; and wherein the sequence of an optical delay line and a modulator is interchangeable in a respective series circuit.

5. An optical delay line having a line input and a line output and having a variable delay, comprising:

a light waveguide connected between the line input and the line output, the light waveguide being wound on a coil body; and a device for adjusting and controlling the temperature of the light waveguide;

the waveguide and coil body are arranged in a heatable liquid.

6. The optical delay line according to claim 5, wherein the coil body is composed of a material with good thermal conductivity.

7. The optical delay line according to claim 5, wherein the coil body is composed of a metal.

8. The optical delay line according to claim 5, wherein the optical delay line is employed in a multiplexer for optical digital signals, whereby a first modulator is directly connected to a source of optical pulses that are comparatively short compared to a repetition rate of the optical pulse; wherein at least one series circuit of a first optical delay line and second modulator is also connected to said source; and wherein a delay of the first optical delay line corresponds to a bit period of the optical digital signals and a delay of a further optical delay line, respectively corresponds to a bit period longer than that of a preceding optical delay line; wherein outputs of the modulators are connected to a common light waveguide connected to an optical output of the multiplexer; and wherein the sequence of an optical delay line and a modulator is interchangeable in a respective series circuit.

9. A multiplexer for optical digital signals, comprising:

optical delay lines each having a line input and a line output and having a variable delay;

each of said optical delay having a light waveguide connected between the line input and the line output and having a device for adjusting and controlling the temperature of the light waveguide;

a source of optical pulses that are comparatively short compared to a repetition rate of the optical pulses;

a first modulator connected to the source of optical pulses;

a series circuit of a first optical delay line and a second modulator connected to said source of optical pulses;

a delay of the first optical delay line corresponding to a bit period of the optical digital signals;

outputs of the first and second modulators being operatively connected to a common light waveguide connected to an optical output of the multiplexer;

the optical delay line and the modulator being interchangeable in a respective series circuit;

the waveguide and coil body being arranged in a heatable liquid.

10. The optical delay line according to claim 9, wherein the coil body is composed of a material with good thermal conductivity.

11. The optical delay line according to claim 10, wherein the coil body is composed of a metal.

12. A multiplexer for optical digital signals, comprising:

optical delay lines each having a line input and a line output and having a variable delay;

each of said optical delay having a light waveguide connected between the line input and the line output and having a device for adjusting and controlling the temperature of the light waveguide;

a source of optical pulses that are comparatively short compared to a repetition rate of the optical pulses;

a first modulator connected to the source of optical pulses;

a series circuit of a first optical delay lien and a second modulator connected to said source of optical pulses;

a delay of the first optical delay line corresponding to a bit period of the optical digital signals;

outputs of the first and second modulators being operatively connected to a common light waveguide connected to an optical output of the multiplexer;

the optical delay line and the modulator being interchangeable in a respective series circuit;

the coil body having a central bore in which a heating element, connected to a temperature control, is secured in highly thermally conductive fashion.

13. The optical delay line according to claim 12, wherein the coil body is composed of a material with good thermal conductivity.

14. A multiplexer for optical digital signals, comprising:

a plurality of optical delay lines each having a line input and a line output and having a variable delay;

each of said optical delay lines having a light waveguide connected between the line input and the line output and having a device for adjusting and controlling the temperature of the light waveguide;

a source of optical pulses that are comparatively short compared to a repetition rate of the optical pulse;

a plurality of modulators;

a first modulator of said plurality of modulators connected to the source of optical pulses;

a plurality of series circuit, each having a respective optical delay line of said plurality of optical delay lines and a respective modulator of said plurality of modulator, connected to said source;

a delay of a first optical delay line of said plurality of optical delay lines corresponding to a bit period of the optical digital signals and a delay of further optical delay lines, of said plurality of optical delay lines, corresponding to a bit period that is longer than a bit period of a preceding optical delay line of said plurality of delay lines;

outputs of the modulators being operatively connected to a common light waveguide that is connected to an optical output of the multiplexer;

an optical delay line and a modulator being interchangeable in a respective series circuit;

the light waveguide being wound on a coil body;

the waveguide and coil body being arranged in a heatable liquid.

15. The optical delay line according to claim 14, wherein the coil body is composed of a material with good thermal conductivity.

16. The optical delay line according to claim 15, wherein the coil body is composed of a metal.

17. A multiplexer for optical digital signals, comprising:

a plurality of optical delay lines each having a line input and a line output and having a variable delay;

each of said optical delay lines having a light waveguide connected between the line input and the line output and having a device for adjusting and controlling the temperature of the light waveguide;

a source of optical pulses that are comparatively short compared to a repetition rate of the optical pulse;

a plurality of modulators;

a first modulator of said plurality of modulators connected to the source of optical pulses;

a plurality of series circuit, each having a respective optical delay line of said plurality of optical delay lines and a respective modulator of said plurality of modulator, connected to said source;

a delay of a first optical delay line of said plurality of optical delay lines corresponding to a bit period of the optical digital signals and a delay of further optical delay lines, of said plurality of optical delay lines, corresponding to a bit period that is longer than a bit period of a preceding optical delay line of said plurality of delay lines;

outputs of the modulators being operatively connected to a common light waveguide that is connected to an optical output of the multiplexer;

an optical delay line and a modulator being interchangeable in a respective series circuit;

the light waveguide being wound on a coil body;

the coil body having a central bore in which a heating element, connected to a temperature control, is secured in highly thermally conductive fashion.

18. The optical delay line according to claim 17, wherein the coil body is composed of a material with good thermal conductivity.

19. The optical delay line according to claim 18, wherein the coil body is composed of a metal.

* * * * *